United States Patent

Erlichman

[15] 3,682,076
[45] Aug. 8, 1972

[54] SUPPORT MEMBER FOR PREVENTING INVERTED INSERTION OF A FILM CASSETTE

[72] Inventor: Irving Erlichman, Wayland, Mass.
[73] Assignee: Polaroid Corporation, Cambridge, Mass.
[22] Filed: May 14, 1971
[21] Appl. No.: 143,450

[52] U.S. Cl. .................................. 95/71, 95/19
[51] Int. Cl. ....G03b 17/26, G03b 17/32, G03b 19/10
[58] Field of Search ........95/71, 66, 31 R, 316 A, 13, 95/19, 22; 352/72, 78, 78 C

[56] References Cited

UNITED STATES PATENTS

| 3,604,327 | 9/1971 | Hiroshi Hirata | 352/78 R |
| 3,362,774 | 1/1968 | Easterly | 352/72 |
| 3,161,118 | 12/1964 | Wareham | 95/19 |
| 2,991,702 | 7/1961 | Eloranta | 95/22 X |

Primary Examiner—Joseph F. Peters, Jr.
Attorney—Brown and Mikulka, Alfred E. Corrigan and Lawrence G. Norris

[57] ABSTRACT

A camera having a film receiving chamber and a support member mounted within the chamber for urging and supporting a properly inserted film cassette into position for exposure of a film unit contained therein. The support member includes first and second sections spaced from each other to define a gap which is adapted to releasably retain a portion of the film cassette upon inverted insertion of the latter into the film receiving chamber, thereby preventing full insertion of the film cassette into the chamber.

12 Claims, 6 Drawing Figures

INVENTOR.
IRVING ERLICHMAN 3,682,076

SUPPORT MEMBER FOR PREVENTING INVERTED INSERTION OF A FILM CASSETTE

BACKGROUND OF THE INVENTION

1. Field of the Invention

This invention relates to support members for urging a film cassette into position within a camera for exposure of a film unit contained therein.

2. Description of the Prior Art

Support members of the type described are of course well known, but conventional support members suffer from one general defect; i.e., they perform only one function, namely, to urge a film cassette toward and support it at the focal plane of a camera. In past years this was fine; however, in today's highly competitive photographic industry, emphasis is being directed to the cost and compactness of the photographic products and the convenience with which the product can be used. However, usually the ratio between cost and compactness is an inverse one; i.e., the cost of the product increases as the product approaches its maximum compactness. Further, adding items of convenience to the product generally results in higher manufacturing costs.

SUMMARY OF THE INVENTION

The present invention relates to a unique, inexpensive support member adapted for use with a film cassette of the type shown in the copending application of Richard Paglia entitled "Apparatus for Interfacing Photographic Camera and Film Cartridge," Ser. No. 136,071 filed Apr. 21, 1971, and assigned in common herewith. The support member not only performs its time honored function of urging the film cassette toward and supporting it at the focal plane of a camera but also functions as a means for preventing the full insertion of the film cassette into a camera in an inverted manner, i.e., with the exposure window in the cassette facing away from the camera's focal plane. This additional function of the support member adds a convenience to the camera, i.e., the prevention of improper loading of the film cassette, without adding to the cost or subtracting from the compactness of the camera.

In a preferred embodiment, the support member comprises a cantilever mounted spring having first and second sections spaced from each other to define a gap therebetween. The support member is mounted in the path of travel that the film cassette takes as it is being inserted into the camera's film chamber. Upon proper insertion of the film cassette into the film chamber, a rear wall of the cassette engages and rides over the first section of the support member as it is guided upwardly toward a positioning member which in turn locates or aligns the cassette in position for exposure of the forwardmost film unit contained therein. Thereafter, the support member assists in supporting the cassette at the exposure position. Should the cassette be inadvertently inserted into the chamber in an inverted manner, a portion of the forward wall of the cassette will engage the first section and move or deflect the first and second sections to a position in which the aforementioned portion of the forward wall can pass to a position between the first and second sections. As the exposure aperture in the forward wall of the cassette passes over the first section, the first section, which heretofore had been held downwardly against its own bias by the portion of the cassette, is allowed to move upwardly into the exposure aperture, thereby positioning the first section on one side of the portion of the cassette's forward wall and the second section on the other side of the wall portion. In other words, the upward movement of the first and second sections in response to the absence of force on the first section results in the wall portion being located in the gap between the first and second sections. The second section is configured to prevent any further movement of the cassette into the chamber while the first section includes an inclined camming surface which, upon applying a withdrawal force on the cassette, is adapted to be cammed to a position which will allow the cassette to be withdrawn from the chamber.

In an alternative embodiment, the support member includes first and second sections extending in cantilever fashion from a common base section toward each other to define a gap for receiving a portion of an inverted film cassette. The base section is also provided with a pair of elongated slots which are adapted to allow the passage therethrough of a pair of resiliently biased electrical contacts for electrical engagement with a pair of battery terminals located in alignment with a pair of openings in the rear wall of the cassette.

In each of the described embodiments, the support member is of unitary construction, thereby facilitating the manufacture and assembly thereof.

An object of the invention is to provide a photographic camera having a support means therein for urging a properly inserted film cassette into position for exposure of a film unit contained therein and for preventing insertion of the cassette into the camera in an inverted manner.

Another object of the invention is to provide photographic apparatus including a camera having means for positioning a film cassette in position for exposure of a film unit contained therein, a film cassette and a support means for cooperating with each other to guide a properly inserted cassette into alignment with the positioning means and to prevent the full insertion of the cassette into the camera in an inverted manner.

Still another object of the invention is to provide a support member of the type which will not only urge a properly inserted film cassette into position within a camera for exposure of a film unit contained therein but will also prevent insertion of the cassette into the camera in an inverted manner.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
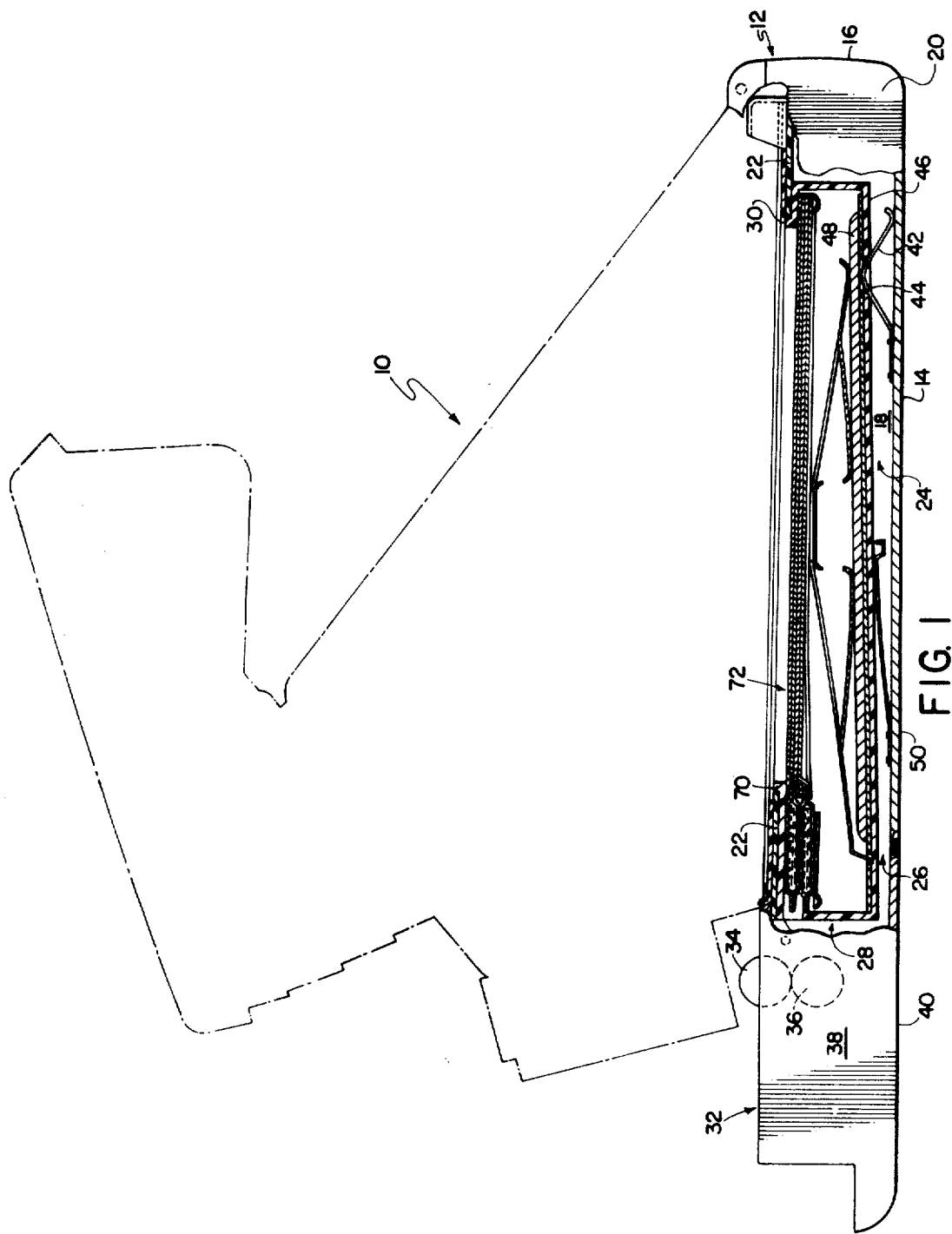
FIG. 1 is an elevational view, partly in section, of a camera embodying the instant invention, most sections of the camera being shown in phantom for purposes of clarity.
Figure 3:
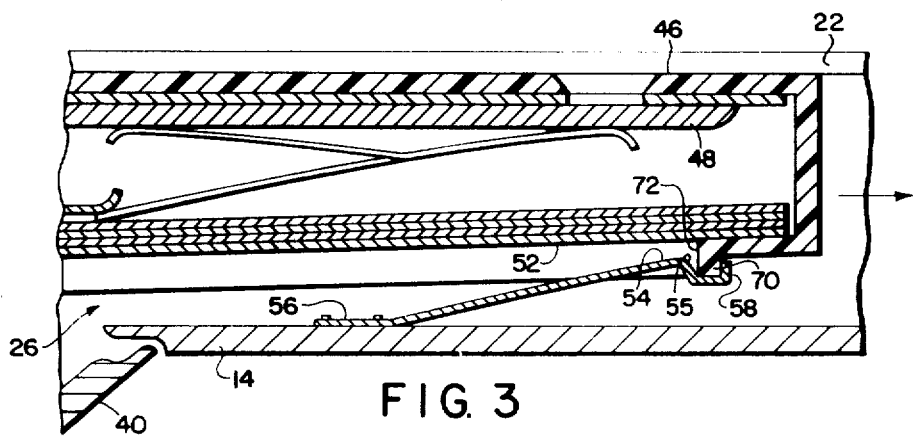
FIG. 3 is an enlarged fragmentary view showing the relationship between the support means of FIG. 2 and a film cassette which has been inserted into the camera of FIG. 1 in an inverted manner.
Figure 4:
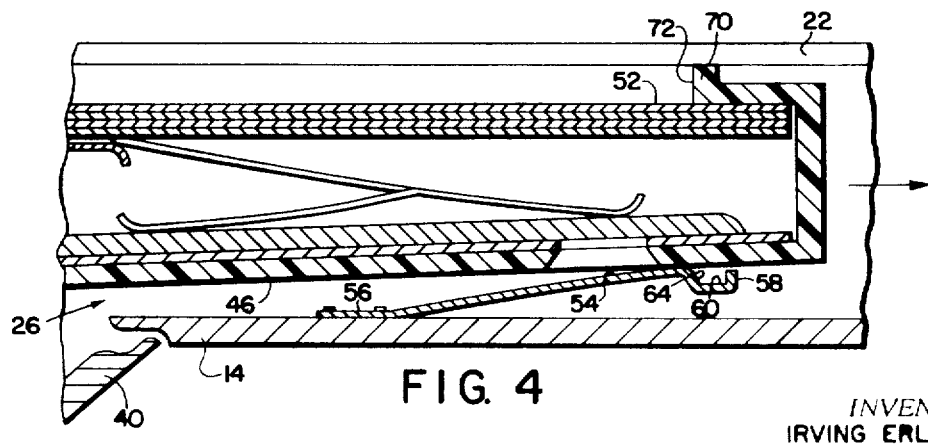
FIG. 4 is a view similar to FIG. 3 showing the relationship between the support means of FIG. 2 and a properly inserted film cassette.

Reference is now made to FIG. 1 of the drawings wherein is shown a camera 10 of the type shown in the copending application of Alfred H. Bellows, Ser. No. 102,775, filed Dec. 30, 1970, and assigned in common herewith. Camera 10 includes a main housing section 12 having a rear wall 14, an end wall 16 and side walls 18 and 20. Walls 14, 16, 18 and 20 cooperate with a plate 22 to define a chamber 24 having an open end 26 through which a film cassette 28 is adapted to be inserted. Plate 22 has a rectangular shaped opening 30 therein which is adapted to function as a positioning means for the film cassette 28, as will be more fully described hereinafter. Mounted adjacent to and in closing relation to the open end 26 of chamber 24 is a roller housing section 32 having suitable means for mounting a pair of rollers 34 and 36 between side walls 38 (only one of which is shown) and above a rear wall 40. Housing section 32 is pivotally coupled to housing section 12 for movement between the position shown in FIG. 1 wherein the rollers 34 and 36 are in position to receive a film unit as it exits from film cassette 28 and a loading position, as shown in FIGS. 3 and 4, wherein the film cassette 28 may be inserted into or withdrawn from chamber 24 by way of open end 26.

Mounted within chamber 24 and upon rear wall 14 is a pair of laterally spaced electrical contacts 42 (only one of which is shown), each of which is adapted to enter an aperture 44 in the rear wall 46 of film cassette 28 to make electrical contact with the battery terminals of battery 48 for providing energy to components of the camera. Also mounted within chamber 24, on rear wall 14, and in the path of travel of film cassette 28, is a support means or member 50 which is adapted to urge a properly inserted film cassette into position for exposure of the forwardmost film unit 52 contained therein and to prevent the full insertion of a film cassette into chamber 24 in an inverted manner.

Figure 2:
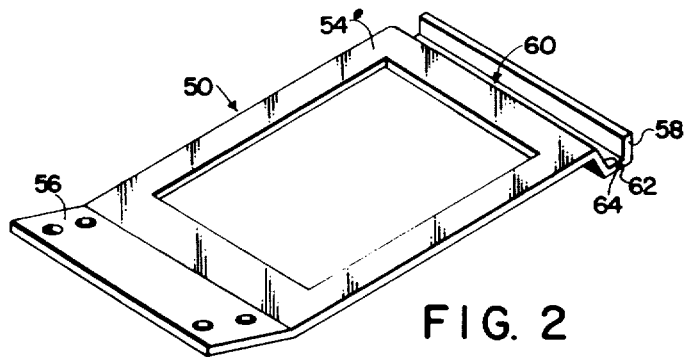
FIG. 2 is an enlarged perspective view of a preferred type of support means which forms a part of the invention.

Support means 50, as is clearly shown in FIG. 2, is formed from a resilient material, e.g., spring metal, and includes a first section 54 extending upwardly from a mounting flange 56, a second section 58 longitudinally spaced from the first section 54, thereby defining a gap 60 therebetween and means 62 including a camming surface 64 coupled between the first and second members 54 and 58, respectively.

Referring back briefly to FIG. 1, it can be seen that film cassette 28 is tapered from left to right and includes an endless rib or flange 70 extending upwardly from the forward wall of the cassette to define a rectangular shaped exposure aperture 72 in the cassette's forward wall. Rectangular shaped opening 30 in plate 22 is adapted to telescopically receive flange 70 to properly position the forwardmost film unit 52 in position for exposure to light passing through exposure aperture 72.

To insert a film cassette 28 into the chamber 24, roller housing section 32 is pivoted in a counterclockwise direction to provide access to the open end 26 of the chamber 24. The film cassette 28 is then inserted narrow end first through the open end and into the chamber in the direction shown by the arrows in FIGS. 3 and 4. Should the insertion be made with the cassette in an inverted position, as shown in FIG. 3, a portion of the cassette, i.e., flange 70, will be directed by the walls of the chamber 24 into engagement with first section 54 of the support means 50 to deflect the latter against its normally upward bias. Flange 70 rides up first section 54 until it reaches the high point 55 of first section 54. Further movement of the cassette to the right results in the high point 55 being located in alignment with the exposure aperture 72. In this position the high point 55 is no longer being held down by the structure of the cassette and first and second sections 54 and 58 are free to move upwardly under their own bias to trap flange 70 in gap 62, thereby preventing further movement of the cassette into the chamber. The high point 55 of first section 54 is allowed to enter exposure aperture 72 due to the smaller lateral dimension of the support means 50 relative to the lateral dimension of the aperture 72, the lateral dimension being taken in a direction perpendicular to side walls 18 and 20. Also, the lateral dimension of support means 50 is greater than that of openings 44 in the rear wall of the cassette to prevent the high point 55 from entering the openings 44. As can be seen in FIG. 3, the distance that high point 55 can travel into the exposure aperture 72 is limited by the depth of gap 60. Accordingly, the depth of gap 60 is selected to ensure that flange 70 will bottom out in gap 60 before the high point 55 reaches a position within aperture 72 where it may possibly damage the film units 52.

Once the user is aware of his mistake, i.e., inverted insertion, either by noticing that further forward movement of the cassette has been prevented or by noticing that roller housing section 32 cannot be returned to the operative position shown in FIG. 1 because a relatively large portion of the cassette 28 is still located outside the chamber 24, he may remove the cassette by withdrawing the latter to the left (as viewed in FIG. 3). A withdrawal force to the left will bring flange 70 into engagement with camming surface 64 to cam first section 54 downwardly, thereby moving both first and second sections 54 and 58 to a position which will allow withdrawal of the cassette from the chamber 24. The film cassette 28 is then reinserted (narrow end first) in the position shown in FIG. 4 wherein the rear wall 46 of the cassette 28 deflects the support means 50 downwardly as the cassette is moved to the right. During this movement, the support means maintains a continuous upward bias on the cassette until the cassette reaches a position wherein the flange 70 defining the exposure aperture 72 is in alignment with the opening 30 in plate 22. At this time, the support means 50 urges the cassette upwardly into engagement with the locating means, i.e., the structure defining opening 30, to locate the forwardmost film unit in position for exposure. The cassette is maintained in the latter position by the bias of either the support means 50 of contacts 42 or both.

Figure 5:
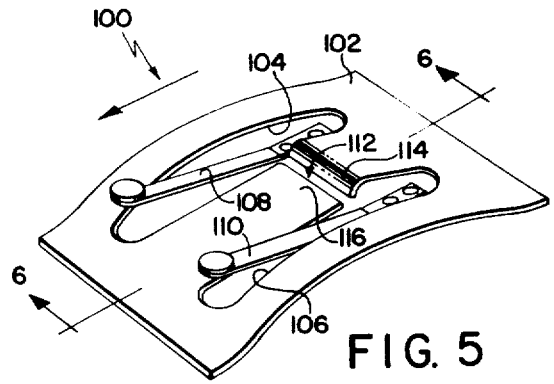
FIG. 5 is a perspective view of an alternative embodiment of a support means usable in the invention.
Figure 6:
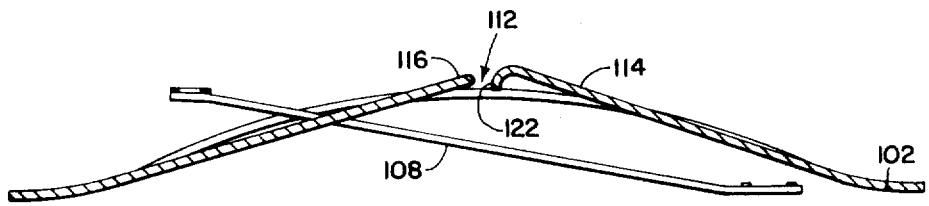
FIG. 6 is an enlarged sectional view taken along the line 6—6 in FIG. 5.

Reference is now made to FIGS. 5 and 6 of the drawings wherein is shown a modification of the support means shown in FIGS. 1 – 4. In this embodiment, the support means 100 is again formed as a unitary structure from any suitable material, e.g., spring metal. Support means 100 includes a curved base plate 102 which is attached to the interior surface of wall 14 at a point substantially midway between the ends of the chamber 24. An H-shaped opening formed in plate 102 includes a pair of elongated openings 104 and 106 which are adapted to allow the passage therethrough of a pair of electrical contacts 108, and 110, similar to those previously described, and a transverse opening 112. Opening 112 forms a gap between first and second sections 114 and 116 which extend in cantilever fashion away from plate 102 and toward each other. Support means 100 functions in a manner similar to support means 50, i.e., upon proper insertion of a film cassette into the chamber in the direction shown by the arrow, the rear wall of the cassette deflects first and second sections 114 and 116, respectively, until the flange 70 is in alignment with the opening 30 in plate 22 whereupon the cassette is urged upwardly into position, as hereinbefore described, by the resilience of support means 100. Obviously, at this time, the contacts 108 and 110 will be aligned with openings in the rear wall of the cassette to enable electrical engagement between the contacts 108 and 110 and the terminals of the cassette's battery. Should the user inadvertently insert the film cassette into the chamber 24 in an inverted manner, the previously described portion of flange 70 will ride up on first section 114 while simultaneously deflecting it until it gets to a point above gap 112. At this point, first section 114 will spring upwardly behind the flange 70 and into the exposure aperture 72 while second section 116 will engage the opposite side of flange 70 to releasably trap the flange 70 therebetween. The cassette can now be moved only to the right (as viewed in FIGS. 5 and 6) in order to withdraw the improperly inserted cassette. When a withdrawal force is applied to the cassette, flange 70 engages a camming surface 122 extending downwardly from first section 114 to deflect the latter to a position wherein the cassette 28 may be withdrawn from the chamber 24.

From the foregoing it can be seen that there has been described a new, simple and inexpensively manufactured support means which combines a plurality of functions into one unitary structure. The support means functions to urge a properly inserted film cassette into position for exposure of a film unit contained therein and prohibits the insertion of the film cassette into the exposure position in an inverted manner. Although the invention has been described as one wherein an exposure aperture defining flange on a cassette is received by a gap in the support means for preventing further insertion of the cassette in an inverted manner, it is within the scope of the invention to increase the distance between the ends of the first and second members in order to receive any portion of the cassette's forward wall which has a discontinuity therein. For example, where the cassette has a planar forward wall having an exposure aperture therein rather than an exposure defining flange on its forward wall, the gap or the space between the first and second sections could be lengthened such that upon inverted insertion of the cassette, the portion of the camera's forward wall extending between its exposure aperture and the trailing end wall of the cassette (the end wall which is first inserted into the chamber) would be received by the gap to prevent further insertion.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic camera for receiving a film cassette containing film units, comprising:
    means defining a chamber having an open end through which a film cassette is adapted to be inserted;
    means for locating the film cassette in said chamber with one of the film units in the cassette located in position for exposure; and
    an element located in the path of travel of the film cassette through said open end into said chamber having means integral therewith for preventing full insertion of the cassette into said chamber in an inverted position, and when the film cassette is properly positioned, said element allowing full insertion of the cassette into said chamber and urging the film cassette into engagement with said locating means.

2. A photographic camera as defined in claim 1 wherein said element located in the path of the film cassette further includes means defining a gap for receiving a portion of the film cassette during insertion of the film cassette into said chamber in an inverted manner.

3. A photographic camera as defined in claim 2 wherein said element located in the path of the film cassette further includes resilient means for urging the film cassette into engagement with said locating means.

4. A photographic camera as defined in claim 3 wherein said element located in the path of the film cassette includes first and second sections defining said gap, said first section including an inclined surface which is adapted to be engaged by the portion of the film cassette for moving said first section to a position out of locking engagement with the film cassette to permit withdrawal of the film cassette from the chamber.

5. A photographic camera as defined in claim 4 wherein said element located in the path of the film cassette is of unitary construction.

6. Photographic apparatus comprising:
    a camera including means defining a chamber having an open end through which a film cassette is adapted to be inserted;
    a film cassette including at least one film unit adapted to be located in position for exposure;
    means within said camera for locating said film unit in position for exposure;
    an element located in the path of travel of said film cassette through said open end into said chamber having means integral therewith for preventing full insertion of said film cassette into said chamber in an inverted position, and, when properly positioned, said element allowing full insertion of the cassette into said chamber and urging said film cassette into engagement with said locating means; and means on said film cassette adapted to be engaged by said element located in the path of travel of the film cassette upon insertion of said film cassette into said chamber in an inverted position to prevent said full insertion.

7. Photographic apparatus as defined in claim 6 wherein said means on said film cassette are adapted to cooperate with said locating means for locating said film unit in position for exposure.

8. Photographic apparatus as defined in claim 6 wherein said means on said film cassette include means defining an exposure aperture in alignment with said film unit.

9. Photographic apparatus as defined in claim 8 wherein said means defining an exposure aperture include rib means.

10. Photographic apparatus as defined in claim 9 wherein said rib means cooperates with said locating means to locate said film unit in position for exposure.

11. Support means for urging a properly inserted film cassette into position within a camera for exposure of a film unit contained therein and for preventing insertion of the film cassette into the camera in an inverted position comprising:

first and second sections, said first and second sections being spaced from each other to define a gap therebetween, said first section, upon the inverted insertion of the film cassette, being adapted for movement by the film cassette in a first direction to allow a portion of the film cassette to pass to a point between said first and second sections and in a second direction wherein the portion of the film cassette is retained in said gap against further movement into the camera; and means coupled to said first section and engageable by the portion of the film cassette for moving said first section in said first direction to allow withdrawal of the film cassette from the camera.

12. The invention as set forth in claim 11 wherein said support means is of unitary construction.

* * * * *